(12) United States Patent (10) Patent No.: US 8,769,923 B2
Yamamoto et al. (45) Date of Patent: Jul. 8, 2014

(54) LIQUID-FUEL STORAGE VESSEL AND VAPOR JET SYSTEM USING THE SAME

(75) Inventors: Takayuki Yamamoto, Sagamihara (JP); Osamu Mori, Sagamihara (JP); Junichiro Kawaguchi, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 1143 days.

(21) Appl. No.: 12/401,496

(22) Filed: Mar. 10, 2009

(65) Prior Publication Data
US 2009/0223203 A1 Sep. 10, 2009

(30) Foreign Application Priority Data
Mar. 10, 2008 (JP) .................................. 2008-060107

(51) Int. Cl.
*B64G 1/40* (2006.01)
(52) U.S. Cl.
USPC ............................... 60/203.1; 60/257; 60/260
(58) Field of Classification Search
USPC ........................ 60/200.1, 203.1, 257, 260, 221
See application file for complete search history.

(56) References Cited

U.S. PATENT DOCUMENTS

| | | | |
|---|---|---|---|
| 3,075,576 A | | 1/1963 | Danuta |
| 3,176,882 A | * | 4/1965 | Meermans ..................... 222/187 |
| 3,222,498 A | * | 12/1965 | Corridan et al. .............. 392/394 |
| 3,486,302 A | * | 12/1969 | Paynter ........................... 96/174 |
| 3,535,879 A | | 10/1970 | Kuntz |
| 3,659,395 A | * | 5/1972 | Morane et al. .................. 53/470 |
| 3,720,044 A | * | 3/1973 | Grove et al. ..................... 96/219 |

(Continued)

FOREIGN PATENT DOCUMENTS

| EP | 2101056 A1 | 9/2009 |
|---|---|---|
| GB | 2 196 391 A | 4/1988 |

(Continued)

OTHER PUBLICATIONS

D. Gibbon, Dr. J. Ward, N. Kay, "The Design, Development and Testing of a Propulsion System for the SNAP-1 Nanosatellite," Proceedings of the 14th Annual AIAA/USA Conference on Small Satellites, Logan, UT, Aug. 21-24, 2000.*

(Continued)

*Primary Examiner* — Phutthiwat Wongwian
*Assistant Examiner* — Michael B Mantyla
(74) *Attorney, Agent, or Firm* — Blakely, Sokoloff, Taylor & Zafman LLP

(57) ABSTRACT

Disclosed is a liquid-fuel storage vessel for use in a vapor jet system to store liquid fuel, wherein the vapor jet system is adapted to jet the fuel in a state after being vaporized inside the liquid-fuel storage vessel, outside the liquid-fuel storage vessel, to obtain a thrust. The liquid-fuel storage vessel comprises: a hollow tank for storing the liquid fuel, wherein the tank has an ejection port for ejecting the vaporized fuel, outside the liquid-fuel storage vessel therethrough; a heating device for heating the tank; and a porous metal formed to have a plurality of interconnected cells and provided inside the tank, wherein at least a part of the liquid fuel is held in the cells of the porous metal, and heat energy given from the heating device to the tank is transferred to the liquid fuel through the porous metal to cause vaporization of at least a part of the liquid fuel. The liquid-fuel storage vessel of the present invention can obtain a stable thrust level and ensure spacecraft attitude control.

2 Claims, 5 Drawing Sheets

CROSS-SECTIONAL VIEW    TOP PLAN VIEW
(WHEN SEEN THROUGH A TOP WALL)

(56) References Cited

U.S. PATENT DOCUMENTS

| | | | |
|---|---|---|---|
| 3,933,448 A * | 1/1976 | Di Peri | 96/219 |
| 3,984,051 A | 10/1976 | Labbé et al. | |
| 4,322,946 A * | 4/1982 | Murch et al. | 60/203.1 |
| 4,397,408 A * | 8/1983 | Robert | 222/394 |
| 4,461,144 A | 7/1984 | Field | |
| 4,841,723 A * | 6/1989 | Lau et al. | 60/204 |
| 5,111,856 A * | 5/1992 | Baralle | 141/230 |
| 6,216,445 B1 * | 4/2001 | Byers et al. | 60/203.1 |
| 6,263,665 B1 | 7/2001 | Ketsdever et al. | |
| 6,432,178 B2 * | 8/2002 | Lichon et al. | 96/179 |
| 6,973,773 B2 * | 12/2005 | Reinicke | 60/229 |
| 7,137,244 B2 * | 11/2006 | Gronland et al. | 60/257 |
| 2005/0229553 A1 * | 10/2005 | TeGrotenhuis et al. | 55/319 |
| 2006/1145022 | 7/2006 | Buehler | |

FOREIGN PATENT DOCUMENTS

| | | | |
|---|---|---|---|
| GB | 2 374 056 A | 10/2002 | |
| JP | 55 148940 A | 11/1980 | |
| JP | 56 052548 A | 5/1981 | |
| JP | 61053447 A | 3/1986 | |
| JP | 4090498 A | 3/1992 | |
| JP | 5060425 A | 3/1993 | |
| JP | 8295298 A | 11/1996 | |
| JP | 63-048958 A | 4/1998 | |
| WO | WO 2006/106204 A2 | 10/2006 | |
| WO | WO 2006106204 A2 * | 10/2006 | B64G 1/26 |

OTHER PUBLICATIONS

Extended European Search Report for EP Counterpart Patent No. 09003412.5, 9 pgs. (May 25, 2009).

Wiley J. Larson, Jamer R. Wertz, "Space Mission Analysis and Design," Space Technology Library, 1999, pp. 692-693.

M. Tajmar, "Liquid Propulsion Systems," Advanced Space Propulsion Systems, Springer, 2003, pp. 24-26.

M. Tajmar, "Ion Thruster," Advanced Space Propulsion Systems, Springer, 2003, pp. 80-84.

M. Tajmar, "Micropropulsion," Advanced Space Propulsion Systems, Springer, 2003, pp. 99-105.

D. Gibbon, Dr. J. Ward, N. Kay, "The Design, Development and Testing of a Propulsion System for the SNAP-1 Nanosatellite," Proceedings of the 14$^{th}$ Annual AIAA/USA Conference on Small Satellites, Logan, UT, Aug. 21-24, 2000.

Japanese Patent Application No. 2008-060107, Office Action, Issued Apr. 2, 2012, 4 pages.

* cited by examiner

CROSS-SECTIONAL VIEW

TOP PLAN VIEW
(WHEN SEEN THROUGH A TOP WALL)

LIQUID-FUEL STORAGE VESSEL AND VAPOR JET SYSTEM USING THE SAME

BACKGROUND OF THE INVENTION

1. Field of the Invention

The present invention relates to a vessel for storing liquid fuel. In particular, the present invention relates to a liquid-fuel storage vessel suitably usable in a vapor jet system, such as a gas-liquid equilibrium thruster for use in a small-spacecraft propulsion system, and a vapor jet system using the vessel.

2. Description of the Background Art

A representative example of a conventional propulsion system for spacecrafts, such as satellites, includes a cold gas thruster, a hot gas thruster and an ion engine. The cold gas thruster includes one type as described, for example, in Tables 17-4 and 17-5 on pp 692-693 of "Space Mission Analysis and Design", Space Technology Library, 1999. This propulsion system is designed based on the use of high-pressure nitrogen gas, and therefore requires a tank and a pipeline with high resistance to pressure, a pressure regulator and others. Thus, mounting of this propulsion system on a spacecraft leads to an increase in weight of the spacecraft. Further, in this system, fuel is loaded in a gas state. Thus, an energy density is relatively low, and a thrust to be obtained by this propulsion system will be gradually reduced due to pressure drop occurring along with a continuous jetting operation.

The hot gas thruster includes one type as described, for example, in "Liquid Propulsion Systems" on pp 24-26 of "Advanced Space Propulsion Systems", Springer, 2003. This propulsion system requires a combustor, which leads to a complexity in configuration and an increase in weight of the system. Further, in this system, toxic hydrazine is predominantly used as fuel, which goes against advantage in handleability of a small spacecraft. The ion engine includes one type as described, for example, in "Ion Thruster" on pp 80-84 of "Advanced Space Propulsion Systems", Springer, 2003. This propulsion system is required to ionize noble gas, such as xenon, which leads to extremely large power consumption. Further, this system is adapted to jet out extremely-light electrically-charged atoms at an ultra-high speed. Thus, a thrust to be obtained is considerably low, although a specific impulse is considerably high. Moreover, such a jet system cannot be made up without a complicated heavy mechanism.

As above, in case of applying the above conventional spacecraft propulsion systems to small-satellite attitude control or orbital maneuver, there exist problems, such as on-board space and weight, and complexity in configuration.

As a new technology concerning propulsion systems, a thruster using MEMS (abbreviation for Micro Electro Mechanical System: it is also referred to as "micromachine") technologies is being researched and developed.

The thruster using MEMS technologies includes one type as described, for example, in "Micropropulsion" on pp 99-105 of "Advanced Space Propulsion Systems", Springer, 2003. This system is an electromechanical type comprising micro-components fabricated by semiconductor technologies. However, as for space thrusters, this system is in a stage of research and development, but it has not been applied to an actual satellite. Further, this thruster has an extremely low thrust level. Thus, even if this thruster is mounted onto a satellite, it cannot contribute to rapid attitude control or orbital maneuver.

As compared with the propulsion systems having the above problems, a gas-liquid equilibrium thruster has great potential as a small-satellite propulsion system. The gas-liquid equilibrium thruster is adapted to jet out only vapor by means of a vapor pressure of a liquid used as fuel. This provides an advantage of being able to eliminate the need for a gas reservoir and a combustor so as to achieve a reduction in weight and a simplification in configuration of the system. A propulsion system using the principle of gas-liquid equilibrium includes a thruster developed for the small satellite SNAP-1, as described, for example, in D. Gibbon, J. Ward, N. Kay, "The Design, development and Testing of a Propulsion System for the SNAP-1 Nanosatellite", Proceedings of the 14th Annual AIAA/USA Conference on Small Satellites, Logan, Utah, Aug. 21-24, 2000.

The thruster for SNAP-1 doesn't fully utilize the benefit of the gas-liquid equilibrium thruster and has a problem in terms of storage and vaporization of liquid fuel. Specifically, in case of employing a technique of loading liquid fuel in a pipeline, there are restrictions on fuel loading capacity. Further, a temperature control mechanism is simply provided adjacent to a fuel jetting nozzle in order to prevent a mist ejection which is an undesirable phenomenon that liquid fuel is jetted out directly without being vaporized. Thus, the mist ejection cannot be adequately avoided to maintain a stable thrust level. Moreover, during spacecraft attitude control, the loaded fuel in the pipe line is freely moved, which is likely to produce vibration causing a sloshing phenomenon.

[Non-Patent Document 1] "Space Mission Analysis and Design", Space Technology Library, 1999, pp 692-693

[Non-Patent Document 2] "Advanced Space Propulsion Systems", Springer, 2003, "Liquid Propulsion Systems", pp 24-26

[Non-Patent Document 3] "Advanced Space Propulsion Systems", Springer, 2003, "Ion Thruster", pp 80-84

[Non-Patent Document 4] "Advanced Space Propulsion Systems", Springer, 2003, "Micropropulsion", pp 99-105

[Non-Patent Document 5] D. Gibbon, J. Ward, N. Kay, "The Design, development and Testing of a Propulsion System for the SNAP-1 Nanosatellite", Proceedings of the 14th Annual AIAA/USA Conference on Small Satellites, Logan, Utah, Aug. 21-24, 2000

As a solution for the above problems in the thruster of SNAP-1, it is contemplated to employ a technique of storing liquid fuel in a widely-used hollow tank, instead of loading liquid fuel in a pipeline.

However, according to inventors' knowledge, in case where a hollow tank is used in a gas-liquid equilibrium thruster to store liquid fuel, due to occurrence of the incidental phenomenon that liquid fuel stored in a tank is jetted out directly without being vaporized, a specific impulse is significantly lowered to cause deterioration in fuel efficiency.

Further, in the case of using a hollow tank, when an internal pressure of the tank becomes lower along with a jetting operation, local bumping easily occurs due to a small ratio of a surface area to a volume of the liquid fuel, which cause instability in thrust level.

Moreover, when the internal pressure of the tank becomes lower along with a jetting operation, the liquid fuel is vaporized, and an internal temperature of the tank is reduced due to a latent heat of vaporization. This precludes the internal pressure of the tank from returning to a value before the jetting operation, and thereby the thrust level is lowered. Thus, it is necessary to heat the tank by a heater in order to compensate for the reduction in the internal temperature. However, if the tank is simply heated from an outside thereof by the heater, heat from the heater is hardly transferred to the liquid fuel in the tank in a uniform manner.

In case where a hollow tank is used in a gas-liquid equilibrium thruster mounted on a spacecraft, such as a satellite, to store liquid fuel, the liquid fuel in the tank can be freely moved within the tank during spacecraft attitude control, to cause a sloshing phenomenon having adverse effects on the spacecraft attitude control.

SUMMARY OF THE INVENTION

It is therefore an object of the present invention to provide a liquid-fuel storage vessel and a vapor jet system using the vessel, such as a gas-liquid equilibrium thruster to be mounted on a spacecraft. This vessel enables to prevent a mist ejection to obtain a stable thrust level and to suppress the occurrence of a sloshing phenomenon to ensure spacecraft attitude control.

Based on knowledge that the above conventional problems can be solved by providing a foamed metal member having interconnected cells, inside a hollow tank for storing liquid fuel, in such a manner as to allow at least a part of the liquid fuel to be held inside the cells of the foamed metal member, the inventors have reached the present invention.

Specifically, the present invention provides a liquid-fuel storage vessel for use in a vapor jet system to store liquid fuel, wherein the vapor jet system is adapted to jet the fuel in a gas phase after being vaporized inside the liquid-fuel storage vessel to obtain a thrust. The liquid-fuel storage vessel comprises: a hollow tank for storing the liquid fuel, wherein the tank has an ejection port for ejecting the vaporized liquid fuel; a heating device for heating the tank; and a porous metal to have a plurality of interconnected cells which is provided inside the tank, wherein at least a part of the liquid fuel is held in the cells of the porous metal, and heat energy given from the heating device to the tank is transferred to the liquid fuel through the porous metal to cause vaporization of at least a part of the liquid fuel.

In the liquid-fuel storage vessel of the present invention, the porous metal having a plurality of interconnected cells is used for holding liquid fuel in the micro-cells. It is considered that this makes it possible to allow only vaporized fuel to reach the ejection port separately from the liquid fuel, so as to jet out only gas while preventing a mist ejection of the liquid fuel.

Further, the liquid fuel is held in the cells of the porous metal. It is also considered that this makes it possible to restrict a free movement of the liquid fuel in the tank to prevent a sloshing phenomenon.

A pore diameter of the cell of the porous metal and a porosity of the foamed metal may be appropriately determined in view of the above points and in consideration of a viscosity of liquid fuel commonly used in vapor jet systems. For example, a porous metal having a pore diameter of about 100 to 500 μm and a porosity of 70 to 97% may be used.

Furthermore, the porous metal having a plurality of interconnected cells is used for dispersedly holding liquid fuel in the micro-cells. It is considered that this makes it possible to increase a surface area of the liquid fuel and wholly vaporize the liquid fuel in the tank to facilitate extraction of gas so as to obtain a stable thrust.

Although a material of the porous metal is not particularly limited, it is preferable to use a material having chemical stability with respect to the liquid material used and high heat conductivity. For example, a porous metal made of copper or stainless steel may be used.

The liquid fuel to be stored in the liquid-fuel storage vessel of the present invention may include LPG, such as isobutane, and a CFC substitute, such as HFC-134a.

In the liquid-fuel storage vessel of the present invention, the porous metal may have a laminated structure of a plurality of porous metal layers, even if the thickness of each porous metal is thin. For example, the porous metal may be formed by laminating a plurality of thin plate-shaped foamed metals each having a thickness of 1 mm or less.

In the liquid-fuel storage vessel of the present invention, the porous metal fills the tank. For example, the porous metal prepared by laminating a plurality of thin plate-shaped porous metals in the above manner may be joined to an inner wall of the tank using an adhesive excellent in heat conductivity. It is considered that this makes it possible to efficiently transfer heat energy given to the tank, to the liquid fuel, so as to facilitate controlling a temperature of the liquid fuel.

As above, in the present invention, the porous metal having a plurality of interconnected cells is provided inside the tank which conventionally had a void internal space, so that the liquid fuel is held inside the continuous pores of the porous metal according to a viscosity of the liquid fuel. During a fuel jetting operation, only vapor passing through the interconnected cells is reliably jetted out. This makes it possible to prevent a mist ejection where the liquid fuel is jetted directly in a liquid state to cause wasteful use of the liquid fuel, so as to improve fuel efficiency.

In addition, the liquid fuel is held by the porous metal in a dispersed and spread manner. Thus, a surface area of the liquid fuel is increased to prevent bumping of the liquid fuel in the tank so as to prevent a fluctuation in thrust level of the vapor jet system due to the bumping. The reason is that the liquid fuel can be vaporized in a dispersed and spread manner to suppress boiling which would otherwise locally occurs. This makes it possible to reduce the fluctuation in thrust level to be obtained through a gas (vapor) jetting operation, so as to obtain a stable thrust during the jetting operation.

Heretofore, a temperature of liquid fuel in a tank has been controlled based on only heat conduction and convection of the liquid fuel itself. In contract, in the present invention, the liquid fuel is held by the porous metal. Thus, by taking advantage of high heat conductivity of the porous metal, heat from the heating device can be easily transferred to the liquid fuel to quickly control the liquid fuel to have a uniform temperature. This makes it possible to quickly recover an internal temperature/pressure of the tank after the jetting operation so as to maintain a desired thrust even if the jetting operation is performed at short intervals.

Heretofore, in order to suppress a sloshing phenomenon occurring in a tank due to a free movement of liquid fuel, the free movement of the liquid fuel has been restricted by packing the liquid fuel in a bag provided inside the tank, and pressing the bag using a pressure from a gas accumulator or the like. In contrast, in the present invention, the liquid fuel can be dispersedly held by friction between the liquid fuel and the porous metal provided in the tank. This makes it possible to restrict the free movement of the liquid fuel so as to prevent the sloshing phenomenon of the liquid fuel in the tank.

DESCRIPTION OF THE PREFERRED EMBODIMENTS

With reference to the drawings, the present invention will now be described based on a specific embodiment thereof.

Figure 1:
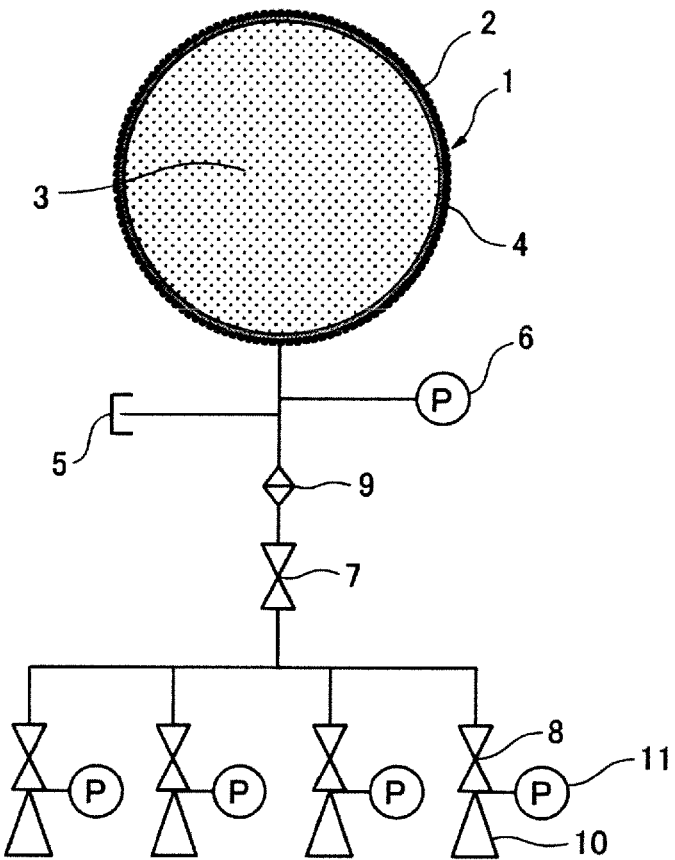
FIG. 1 is a system diagram showing a vapor jet system using a liquid-fuel storage vessel according to one embodiment of the present invention.

FIG. 1 is a system diagram showing a vapor jet system using a liquid-fuel storage vessel according to one embodiment of the present invention.

A tank 1 for storing liquid fuel has an outer wall with a heater 2 which is wound around the entire circumference of an outer wall thereof in such a manner as to control a temperature of liquid fuel stored in the tank 1. A porous metal 3 fills the tank 1, and bonded to an inner wall of the tank 1 by an adhesive 4. The liquid fuel to be stored in the tank 1 will be at least partly held by a plurality of continuous pores (interconnected cells) formed in the porous metal 3.

The liquid fuel is supplied and discharged from a supply/discharge valve 5. A result of the liquid-fuel temperature control can be checked by measuring a temperature of the heater 2 and an internal pressure of the tank 1 using a temperature sensor (not shown) associated with the heater 2 and a first pressure sensor 6, respectively. Each of a latching valve 7 and a propellant valve 8 is adapted to be selectively opened and closed under control to allow vapor of the liquid fuel passing through a filter 9 to be jetted out from a thruster 10 so as to obtain a thrust. The obtained thrust can be estimated by a second pressure sensor 11.

Figure 2:
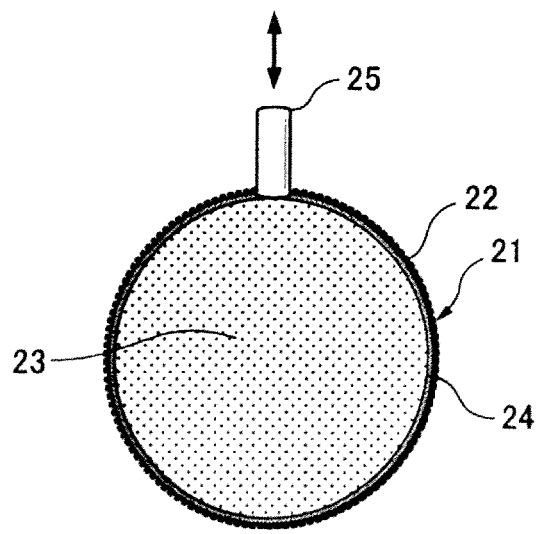
FIG. 2 is a schematic sectional view showing one example of the liquid-fuel storage vessel in the vapor jet system illustrated in FIG. 1.

FIG. 2 is a schematic sectional view showing one example of the liquid-fuel storage vessel in the vapor jet system illustrated in FIG. 1.

A heater 22 wound around an outer wall of a tank 21, and a porous metal 23 is bonded to an inner wall of the tank 21 by an adhesive 24. The tank 21 is provided with a fuel port 25. The fuel port 25 can additionally serve as an ejection port for ejecting vapor of the liquid fuel, outside the tank 21 therethrough.

Figure 3:
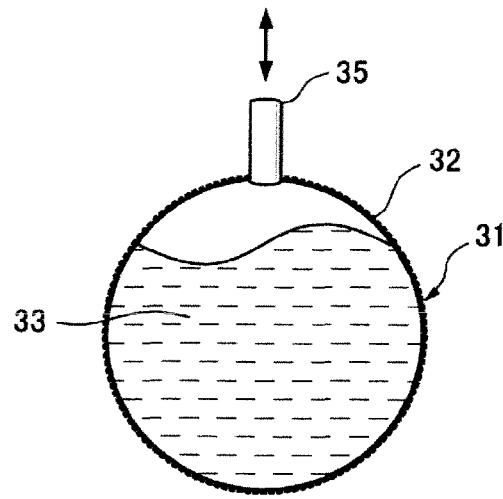
FIG. 3 is a schematic sectional view showing a conventional liquid-fuel storage vessel.

FIG. 3 is a schematic sectional view showing a conventional liquid-fuel storage vessel.

A tank 31 has a void internal space. The tank 31 is filled with liquid fuel supplied thereinto through a fuel port 35. As seen in FIG. 3, the liquid fuel in the tank 31 can be freely moved within the tank 31, and thereby a sloshing phenomenon is highly likely to occur.

Figure 4:
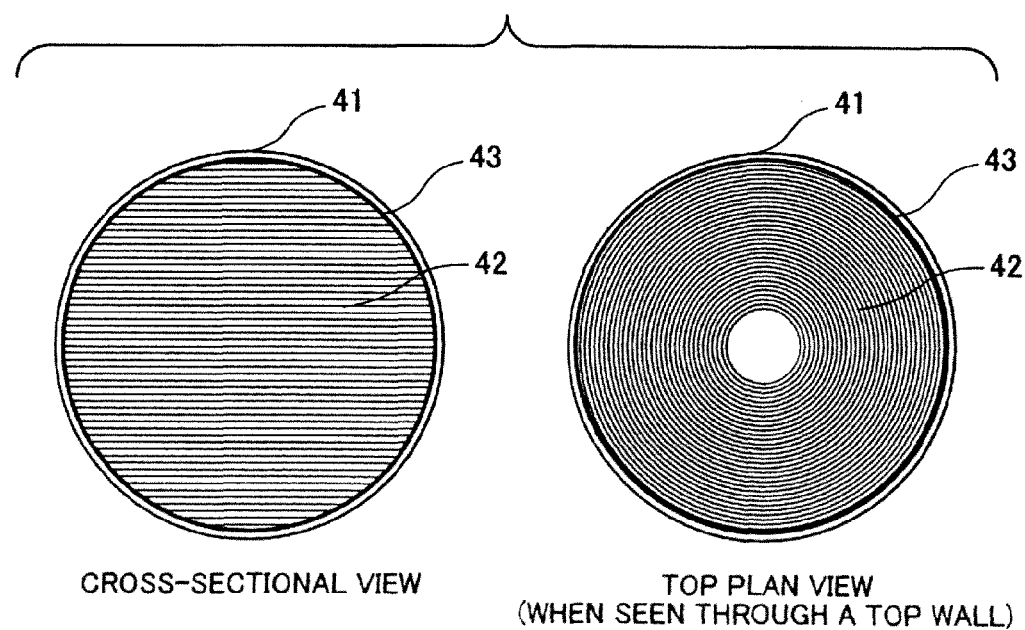
FIG. 4 is schematic sectional and top plan views showing an example of a porous metal in the liquid-fuel storage vessel according to the embodiment.

FIG. 4 is schematic sectional and top plan views showing an example of the porous metal in the liquid-fuel storage vessel according to the embodiment.

A porous metal 42 made, for example, of copper or SUS, and formed, for example, to have a porosity (void ratio) of about 95%, is bonded to an inner wall of a metal tank 41 made, for example, of aluminum or SUS, using an adhesive 43 excellent in heat conductivity.

The porous metal 42 may be prepared by laminating a plurality of thin plate-shaped porous metals each having a thickness about 1 mm, for example, and loaded into the tank 41.

The liquid fuel may be loaded into the tank 41 in such a manner that the porous metal 42 is impregnated therewith as if it is absorbed into a sponge. In a fully loaded state, the liquid fuel can be loaded in an amount approximately corresponding to the porosity of the foamed metal member 42.

EXAMPLE

Figure 5:
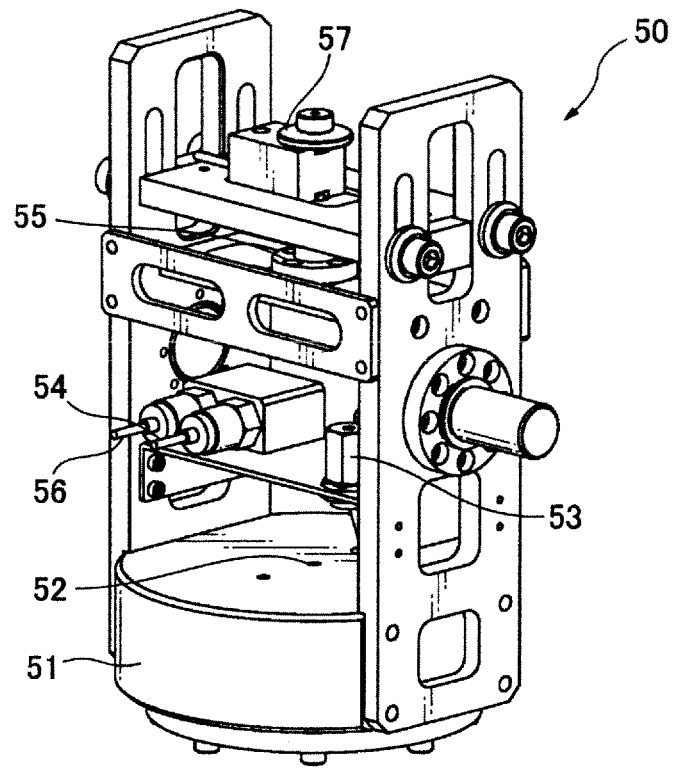
FIG. 5 is a schematic diagram showing a vapor jet system for use in a jetting test.

As shown in FIG. 5, a vapor jet system 50 having a liquid-fuel storage vessel was prepared for a jetting test.

The vapor jet system 50 comprises a tank 51 for storing liquid fuel, a fuel ejection port 52 provided in a central region of a top wall of the tank 51, a supply/discharge valve 53 for selectively supplying and discharging liquid fuel into and from the tank 51, a pressure sensor 54 for measuring an internal pressure of the tank 51, and a thruster 55 for jetting out vapor of the fuel therefrom. The tank 51 was made of stainless steel and formed in a cylindrical shape having a diameter of 76 mm and a height of 36 mm. These elements were connected to each other by a pipeline (not shown) to allow vapor of the fuel ejected from the tank 51 to be jetted out from the thruster 55, under control. As shown in FIG. 5, the vapor jet system 50 further comprises a pressure sensor 56 and a load cell 57 for measuring a thrust obtained by the system.

About 30 g of isobutane was used as the liquid fuel. As a heating device for heating the tank 51, a nichrome wire was wound around an outer peripheral wall of the tank. A feedback control was performed while measuring an internal temperature of the tank 51, to maintain the internal temperature of the tank 51 at a constant value (e.g., 20 to 30° C.) so as to allow an internal pressure of the tank to be set at a vapor pressure.

Figure 6:
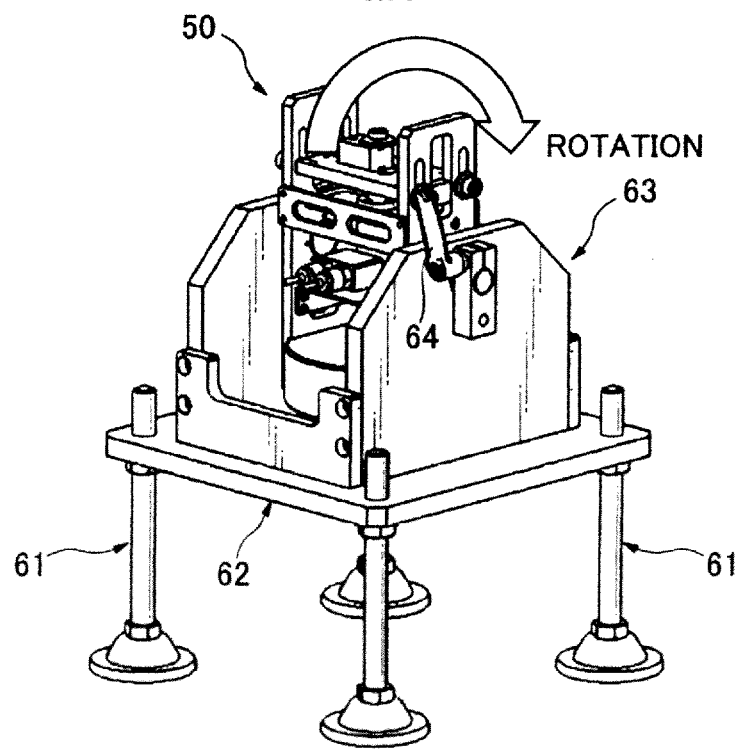
FIG. 6 is a schematic diagram showing a thrust stand for evaluating the vapor jet system in FIG. 5.

In order to evaluate a performance of the vapor jet system 50, a thrust stand as shown in FIG. 6 was prepared. The thrust stand was designed such that the vapor jet system 50 is rotatably held by a jig 63 provided on a stage 62 having four legs 61. A jetting test can be carried out while moving a jet port oriented in a downward direction or a lateral direction (90 degrees with respect to the downward direction) or an upward direction (180 degrees with respect to the downward direction), by adjusting a handle 64 mounted to the jig 63 to rotate the vapor jet system 50. This makes it possible to evaluate the performance of the vapor jet system 50 mounted on a spacecraft as considering an influence of spacecraft attitude control.

Specifically, the performance of the vapor jet system 50 was evaluated from the following aspects:

(1) a thrust estimated from a measurement value of the pressure sensor 56, and a thrust measured by the load cell 57;

(2) the presence or absence of mist ejection based on visual observation; and (3) the presence or absence of bumping of the liquid fuel in the tank.

As for the aspect (3), an acrylic lid was attached to a bottom of the tank 51 to visually check the presence or absence of bumping.

COMPARATIVE EXAMPLE 1

Figure 7:
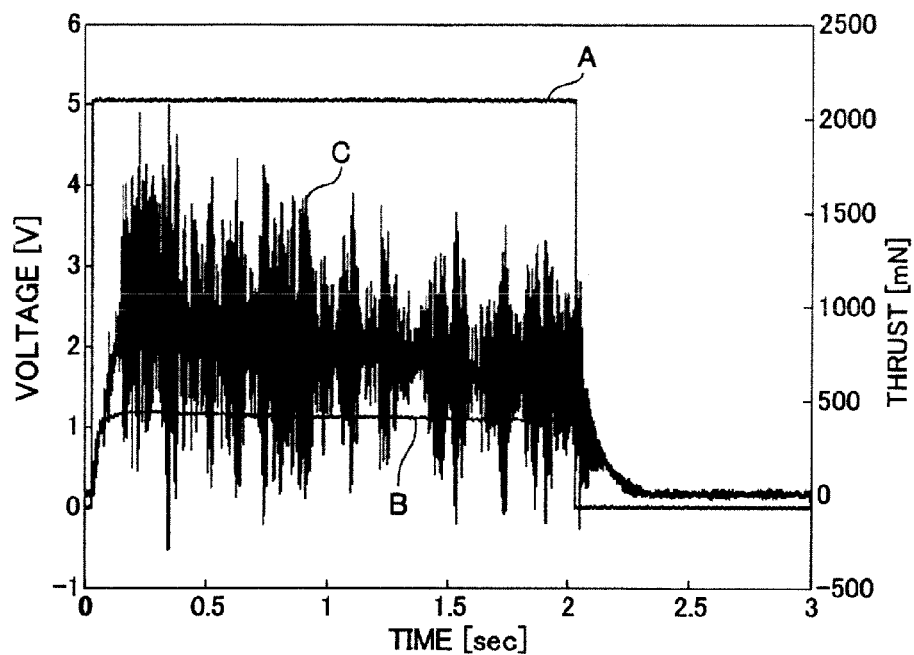
FIG. 7 is a graph showing a result of a jetting test obtained in Comparative Example 1.

For comparison, a jetting test was carried out using a conventional liquid-fuel storage vessel (devoid of the porous metal which fills the tank) under a condition that the jet port was oriented in the downward direction. A result of this jetting test is shown in FIG. 7. In FIG. 7, the line A is a voltage of an input command, wherein a solenoid valve (corresponding to the propellant valve 8 in FIG. 1) is adapted to be opened at 5V to allow vapor of the fuel to be jetted out from the thruster. The line B indicates a thrust estimated from a measurement value of the pressure sensor 56, and the line C indicates a thrust measured by the load cell 57.

As is evidenced by in the shapes of the line B and the line C, a thrust level is unstable. In addition, a phenomenon that the liquid fuel is jetted out in a liquid state was visually observed. It is considered that this mist ejection was caused by the jet port oriented in the downward direction. The occurrence of the mist ejection shows that fuel consumption rate in this system is extremely large.

COMPARATIVE EXAMPLE 2

Figure 8:
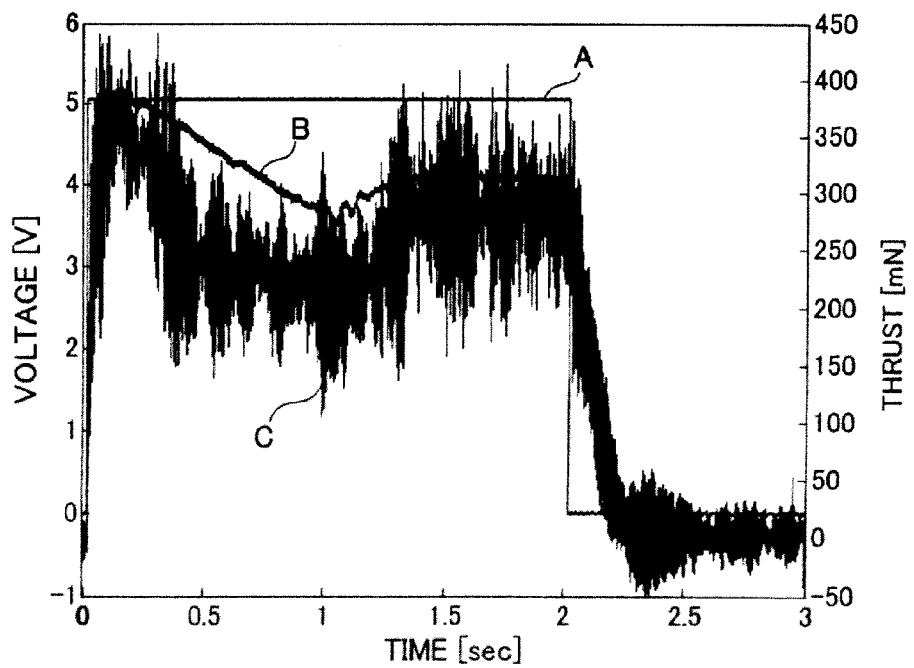
FIG. 8 is a graph showing a result of a jetting test obtained in Comparative Example 2.

A jetting test was carried out using the conventional liquid-fuel storage vessel used in Comparative Example 1 under a condition that the jet port was oriented in the upward direction (180 degrees with respect to the downward direction). A result of this jetting test is shown in FIG. 8. In FIG. 8, the lines A, B, C correspond to those in FIG. 7, respectively.

Although a stable thrust was obtained in an early stage of a jetting operation, a fluctuation in thrust level occurred in subsequent stages. In addition, during the fluctuation in thrust level, bumping of the liquid level in the tank was observed.

INVENTIVE EXAMPLE

Figure 9:
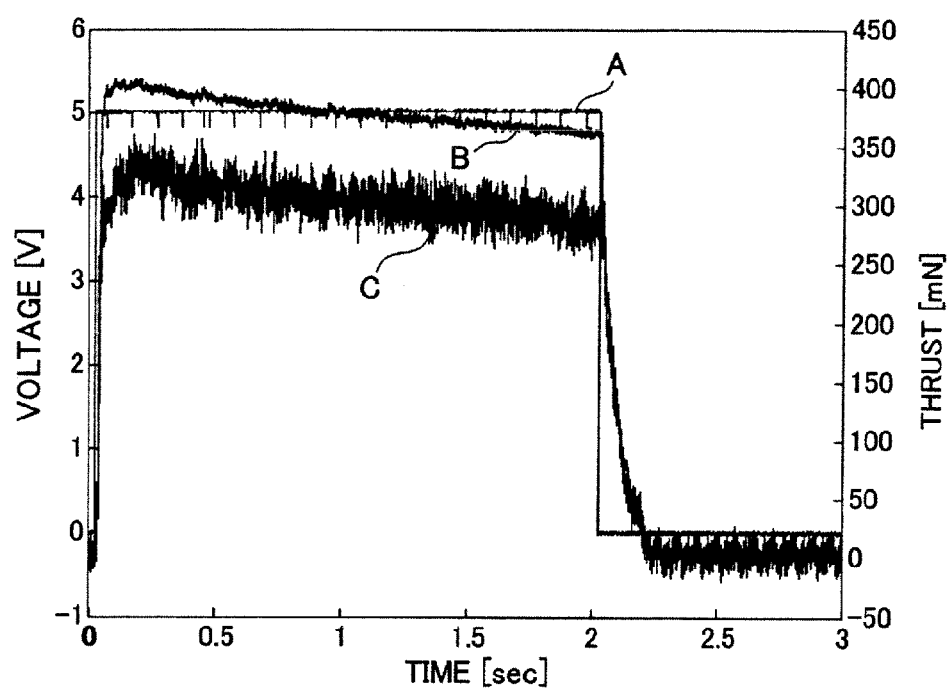
FIG. 9 is a graph showing a result of a jetting test obtained in Inventive Example.

As Inventive Example, a liquid-fuel storage vessel is prepared. This vessel has a porous metal filled inside. The porous metal is laminated by a plurality of porous metal sheets which is made of stainless steel and formed to have a porosity of about 95%, has a pore diameter of 300 μm and a thickness of 1 mm. The laminated porous metal was fixed to the inner wall of the tank to form a liquid-fuel storage vessel. A jetting test was carried out using this liquid-fuel storage vessel under a condition that the jet port is oriented in the downward direction. A result of this jetting test is shown in FIG. 9. In FIG. 9, the lines A, B, C correspond to those in FIG. 7, respectively.

As seen in FIG. 9, a fuel jetting in a gas (vapor) state is maintained to provide a stable thrust level.

What is claimed is:

1. A liquid-fuel storage vessel for use in a vapor jet system to store liquid fuel, the vapor jet system being adapted to jet the fuel outside the liquid-fuel storage vessel to obtain a thrust, in a state after being vaporized inside the liquid-fuel storage vessel, the liquid-fuel storage vessel comprising:

a hollow tank for storing the liquid fuel, the tank having an ejection port for ejecting the vaporized fuel, outside the liquid-fuel storage vessel therethrough;

a heating device for heating the tank; and a porous metal formed to have a plurality of interconnected cells and provided inside the tank, wherein at least a part of the liquid fuel is held in the cells of the porous metal, and heat energy given from the heating device to the tank is transferred to the liquid fuel through the porous metal to cause vaporization of at least a part of the liquid fuel, wherein the porous metal has a laminated structure of a plurality of porous metal layers, wherein the porous metal fills the tank, wherein the porous metal is joined to an inner wall of the tank with a heat conducting adhesive, and wherein the heating device is wound around the entire circumference of an outer wall of the tank.

2. A vapor jet system comprising:

a liquid-fuel storage vessel for use in the vapor jet system to store liquid fuel, the vapor jet system being adapted to jet the fuel outside the liquid-fuel storage vessel to obtain a thrust, in a state after being vaporized inside the liquid-fuel storage vessel, the liquid-fuel storage vessel comprises:

a hollow tank for storing the liquid fuel, the tank having an ejection port for ejecting the vaporized fuel, outside the liquid-fuel storage vessel therethrough;

a heating device for heating the tank; and a porous metal formed to have a plurality of interconnected cells and provided inside the tank, wherein at least a part of the liquid fuel is held in the cells of the porous metal, and heat energy given from the heating device to the tank is transferred to the liquid fuel through the porous metal to cause vaporization of at least a part of the liquid fuel, wherein the porous metal has a laminated structure of a plurality of porous metal layers, wherein the porous metal fills the tank, wherein the porous metal is joined to an inner wall of the tank with a heat conducting adhesive, and wherein the heating device is wound around the entire circumference of an outer wall of the tank;

wherein the vapor jet system being adapted to jet fuel in a state after being vaporized inside the liquid-fuel storage vessel, outside the liquid-fuel storage vessel, to obtain a thrust.

* * * * *